United States Patent
Gretz

(10) Patent No.: US 8,314,350 B1
(45) Date of Patent: Nov. 20, 2012

(54) ELECTRICAL CABLE ENTRY DEVICE WITH FLEXIBLE SLOTTED INSERT

(75) Inventor: Thomas J. Gretz, Port St. Lucie, FL (US)

(73) Assignee: Arlington Industries, Inc., Scranton, PA (US)

( * ) Notice: Subject to any disclaimer, the term of this patent is extended or adjusted under 35 U.S.C. 154(b) by 64 days.

(21) Appl. No.: 13/066,893

(22) Filed: Apr. 27, 2011

Related U.S. Application Data

(63) Continuation-in-part of application No. 12/456,550, filed on Jun. 18, 2009, now Pat. No. 8,124,873.

(51) Int. Cl.
*H02G 3/18* (2006.01)

(52) U.S. Cl. ............ 174/659; 174/66; 174/67; 174/650; 220/241; 220/242

(58) Field of Classification Search .................... 174/53, 174/58, 63, 64, 66, 67, 61, 135, 665, 668, 174/72 A, 659, 57, 660, 650, 152 G, 153 G, 174/655; 220/241, 242, 3.2, 3.8; 439/131, 439/135, 144; 248/300, 342, 49, 48.1, 200, 248/56; 385/134, 135; D13/155, 133, 154; D8/356; 16/2.1, 2.2
See application file for complete search history.

(56) References Cited

U.S. PATENT DOCUMENTS

| | | | |
|---|---|---|---|
| 4,267,995 A * | 5/1981 | McMillan | 174/153 G |
| 4,688,747 A | 8/1987 | Helmsdorfer et al. | |
| 5,101,079 A * | 3/1992 | Rodrigues et al. | 248/56 |
| 5,567,916 A * | 10/1996 | Napiorkowski et al. | 174/153 G |
| 5,726,392 A * | 3/1998 | Farr et al. | 174/660 |
| 6,102,360 A | 8/2000 | Clegg et al. | |
| D443,811 S * | 6/2001 | Tisbo | D8/356 |
| 6,265,670 B1 * | 7/2001 | Duesterhoeft et al. | 174/152 G |
| 6,278,061 B1 * | 8/2001 | Daoud | 174/659 |
| 6,286,698 B2 | 9/2001 | Hague et al. | |
| 6,462,277 B1 | 10/2002 | Young et al. | |
| 7,064,275 B2 * | 6/2006 | Henriott et al. | 174/135 |
| 7,262,372 B2 * | 8/2007 | Ickert | 174/650 |
| D559,660 S * | 1/2008 | DeCosta et al. | D8/356 |
| 7,495,171 B2 | 2/2009 | Gorin et al. | |
| 7,507,912 B1 * | 3/2009 | Sempliner et al. | 174/153 G |
| 7,786,380 B2 * | 8/2010 | Anderson | 174/66 |

* cited by examiner

*Primary Examiner* — Angel R Estrada

(57) ABSTRACT

A cable entry device for routing low voltage cables through walls. The cable entry device includes a rigid cable frame with a frame body having two ends, an opening therein, and a flexible insert within the opening. The flexible insert includes a membrane extending across the opening of the frame body. An arm extends from each end of the frame body. The arms include oval apertures therein which cooperate with fasteners for mounting the frame body directly to a conventional electrical box or conventional low voltage frame. The membrane includes a hole therein and a plurality of open slots extending radially from the hole. The slots enable the cable entry device to accommodate passage of low voltage cables there through for the purpose of providing a portal for routing the cables through a wall.

19 Claims, 6 Drawing Sheets

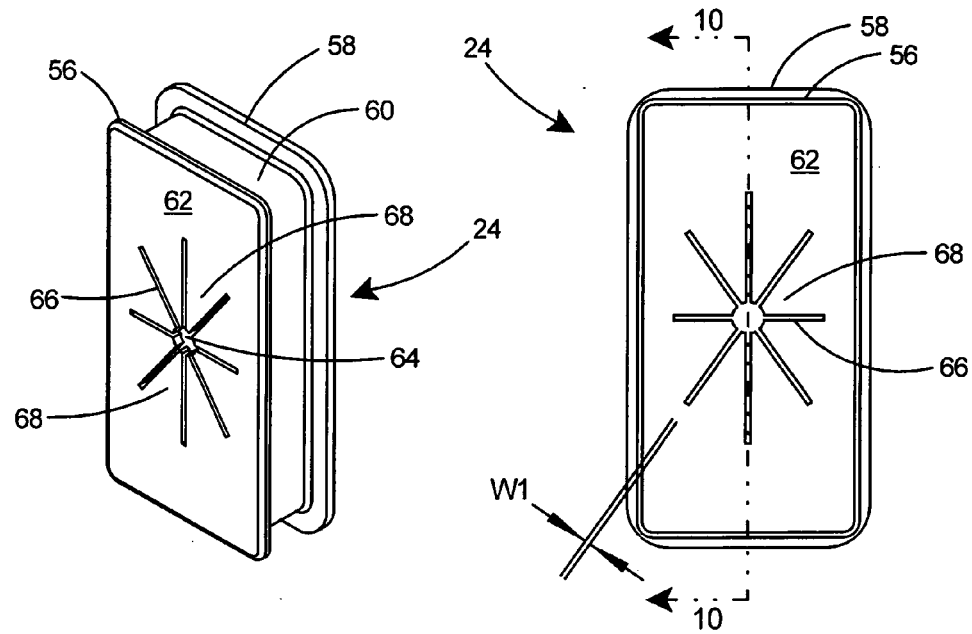
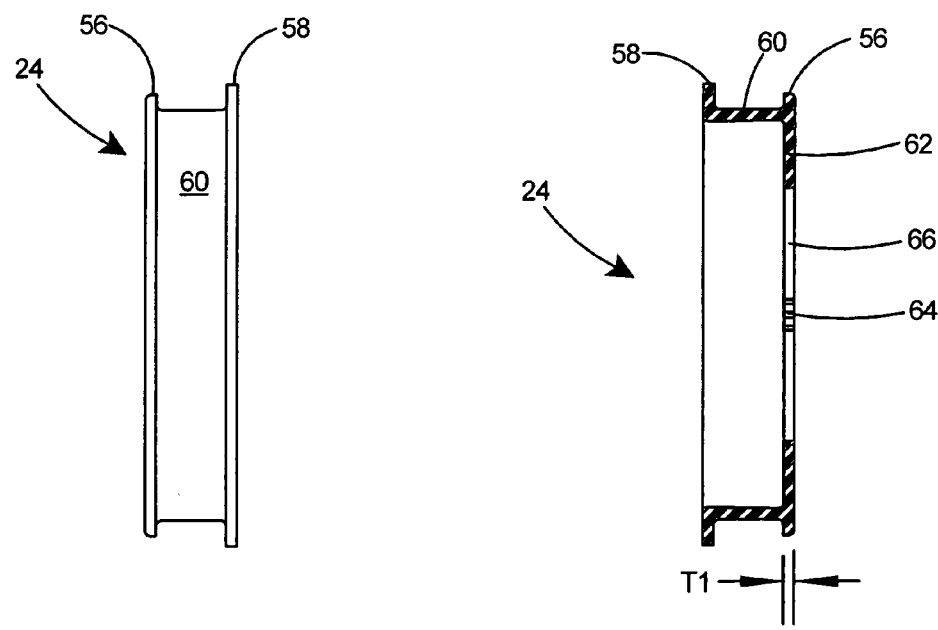
Fig. 7    Fig. 8
Fig. 9    Fig. 10

ELECTRICAL CABLE ENTRY DEVICE WITH FLEXIBLE SLOTTED INSERT

This application is a Continuation-In-Part of U.S. patent application Ser. No. 12/456,550, filed on Jun. 18, 2009 now U.S. Pat. No. 8,124,873 and entitled "Protective Cable Frame for Use with Low Voltage Bracket or Electrical Box", of which the entire contents of said application is incorporated herein in its entirety by reference thereto.

FIELD OF THE INVENTION

This invention relates to the installation of low voltage wiring in buildings and specifically to an electrical cable entry device with flexible slotted insert for routing low voltage electrical or communications cables through interior walls.

BACKGROUND OF THE INVENTION

A wide variety of low voltage components such as telephone cables, coax cables for television and internet service, wiring for home entertainment systems and surround sound, and cables for connecting computers to peripherals such as printers and facsimile machines, are prevalent in today's homes and offices. Frequently it is necessary to route these low voltage wires and cables through interior walls in order to connect low voltage components in separate rooms.

A disadvantage with prior art cable entry devices is that they are not complementary with wall openings prepared for conventional electrical devices. Therefore, in order to install the prior art cable entry device, a hole must be made specifically sized for the device. A further disadvantage with prior art cable entry devices is that they typically include a cable shield that projects outward from the wall. There are many situations in which a homeowner would desire a cable entry installation in which a cable shield or nose portion does not extend outwards, such as when it is desired to place a low voltage device, appliance, or furniture in close proximity to the cable entry device. In such a situation, it would be desirable to install a cable entry device that does not project outward from the wall but at the same time obscures the cable entryway from view.

What is needed therefore is a cable entry device that will mount to conventional electrical boxes and conventional low voltage frames for the purpose of routing low voltage cables there through. The cable entry device should include a low profile so that it does not extend substantially from the box or frame after being attached thereto.

SUMMARY OF THE INVENTION

The invention is a cable entry device for routing low voltage cables through walls. The cable entry device includes a rigid cable frame with a frame body having two ends, an opening therein, and a flexible insert within the opening. The flexible insert includes a membrane extending across the opening of the frame body. An arm extends from each end of the frame body. The arms include oval apertures therein which cooperate with fasteners for mounting the frame body directly to a conventional electrical box or conventional low voltage frame. The membrane includes a hole therein and a plurality of open slots extending radially from the hole. The slots enable the cable entry device to accommodate passage of low voltage cables there through for the purpose of providing a portal for routing the cables through a wall.

OBJECTS AND ADVANTAGES

Several advantages are achieved with the cable entry device of the present invention, including:

(1) The cable entry device provides a portal for routing low voltage wires and cables through walls.
(2) The cable entry device is easy and quick to install.
(3) The slotted design prevents cables from slipping backwards out of the wall.
(4) The slotted entry panel is flexible to protect low voltage cables against abrasion.
(5) The cable entry device can be used with any conventional decorator-style wall plate including those that can accommodate more than one decorator-style device therein.
(6) The cable entry device can be used to provide an aesthetically pleasing cable entry port on any wall.

These and other objects and advantages of the present invention will be better understood by reading the following description along with reference to the drawings.

DESCRIPTION OF THE DRAWINGS

FIG. 1 is a perspective view of the preferred embodiment of a multiple flap cable entry device according to the present invention in alignment with an electrical box and a decorative cover plate that it is used in conjunction with.

FIG. 7 is a perspective view of the flexible insert.
FIG. 8 is a front elevation view of the flexible insert.
FIG. 9 is a side view of the flexible insert.
FIG. 10 is a sectional view of the flexible insert taken along line 10-10 of FIG. 8.

Figure 1:
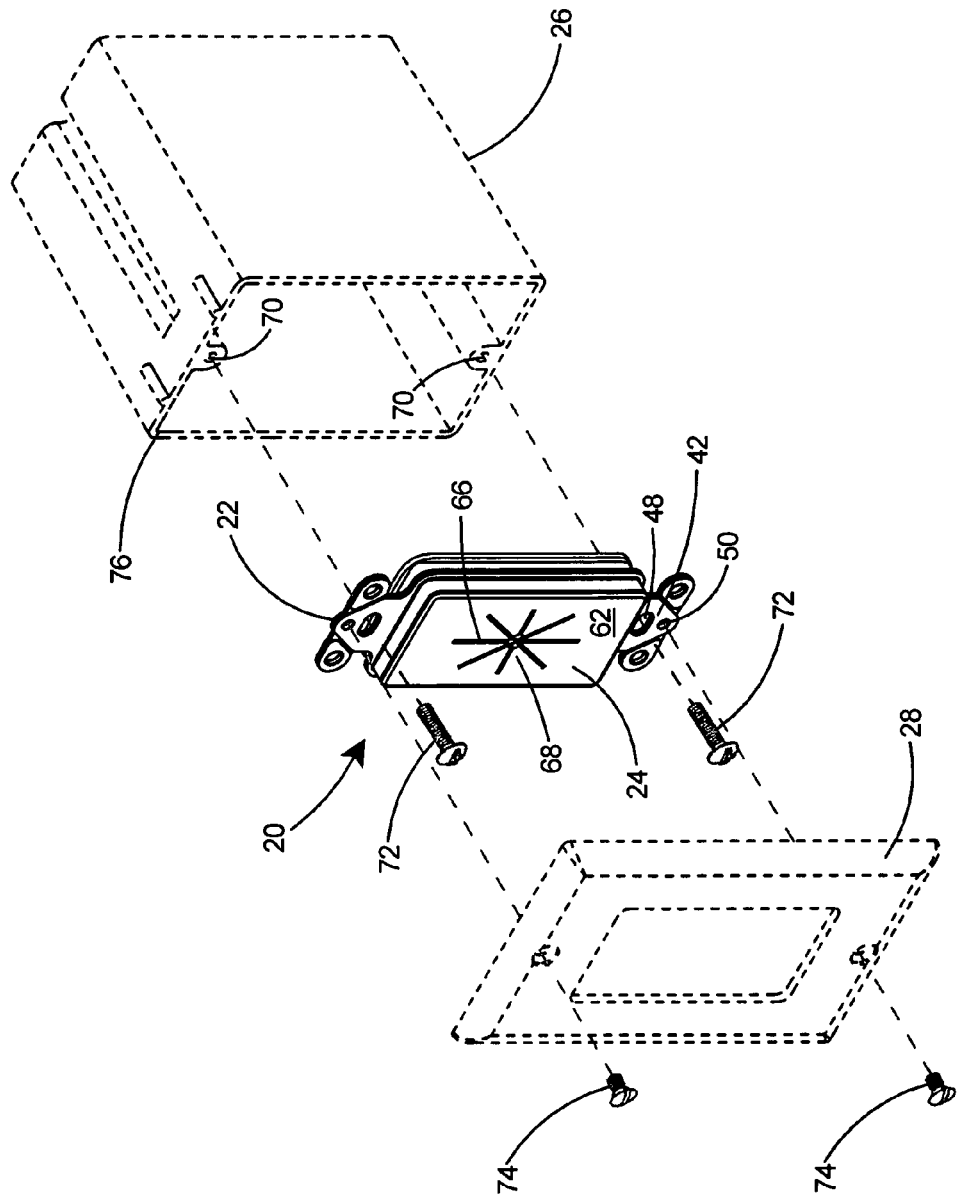

| INDEX TO REFERENCE NUMERALS IN DRAWINGS | |
|---|---|
| 20 | cable entry device with flexible slotted insert |
| 22 | rigid cable frame |
| 24 | flexible insert |
| 26 | electrical box |
| 28 | decorative cover plate |
| 30 | opening |
| 32 | frame body |
| 34 | rounded corner |
| 36 | base plate |
| 38 | side of base plate |
| 40 | end of frame body |
| 41 | outer periphery of frame body |
| 42 | arm |

-continued

INDEX TO REFERENCE NUMERALS IN DRAWINGS

| | |
|---|---|
| 44 | ear |
| 46 | peripheral wall |
| 48 | oval aperture |
| 50 | bore |
| 52 | inner periphery |
| 54 | tapered edge |
| 56 | first rim |
| 58 | second rim |
| 60 | seat |
| 62 | flat membrane |
| 64 | hole |
| 66 | open slot |
| 68 | flap |
| 70 | connection point |
| 72 | fastener |
| 74 | fastener |
| 76 | open face of electrical box |
| T1 | thickness of membrane |
| W1 | width of slot |

DETAILED DESCRIPTION OF THE INVENTION

Figure 2:
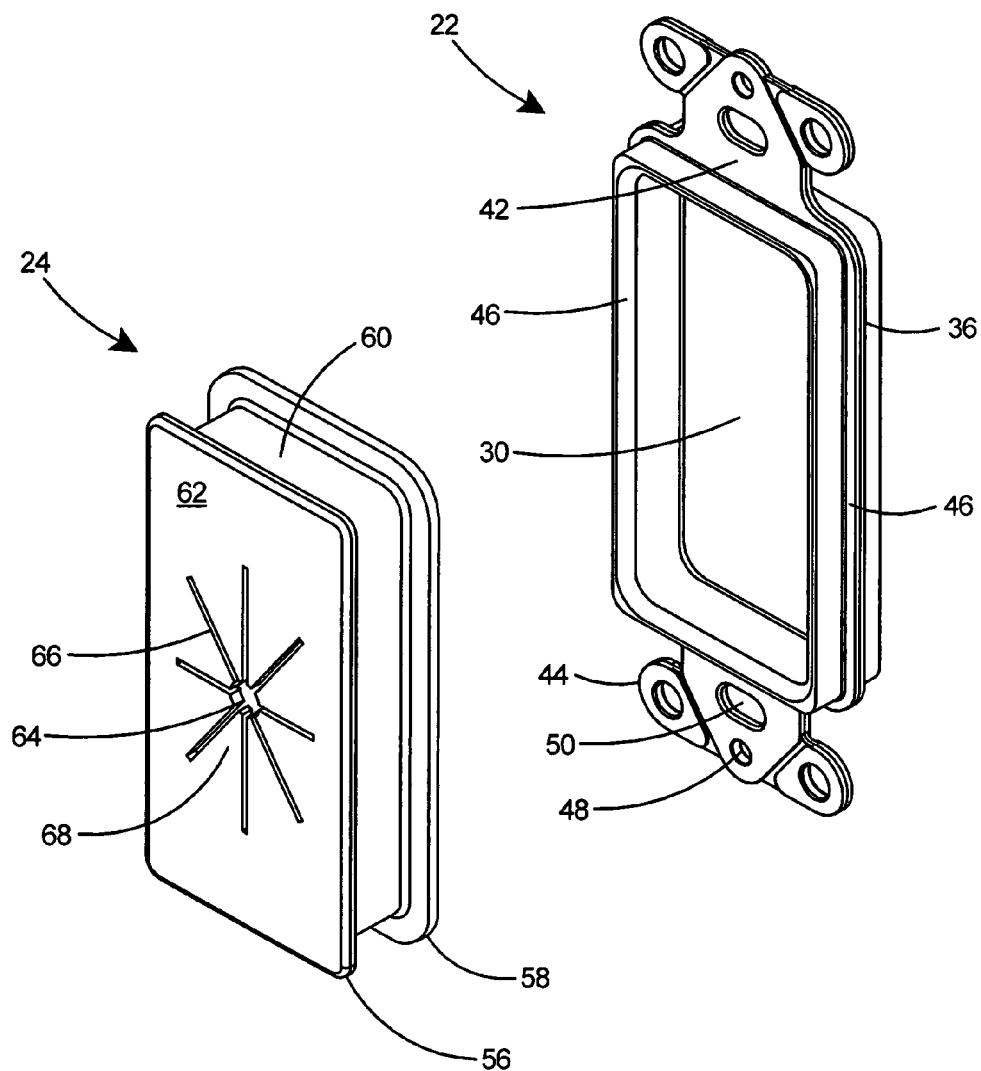
FIG. 2 is an exploded perspective view of a rigid cable frame and a flexible insert that together form the cable entry device of FIG. 1.
Figure 3:
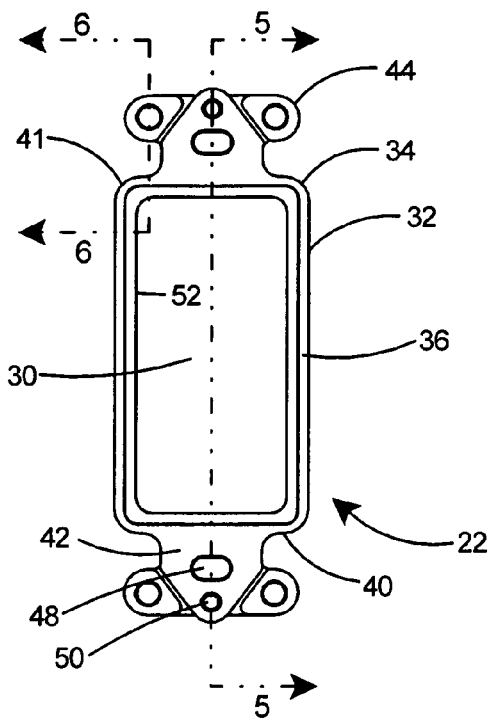
FIG. 3 is a front elevation view of the rigid cable frame.
Figure 4:
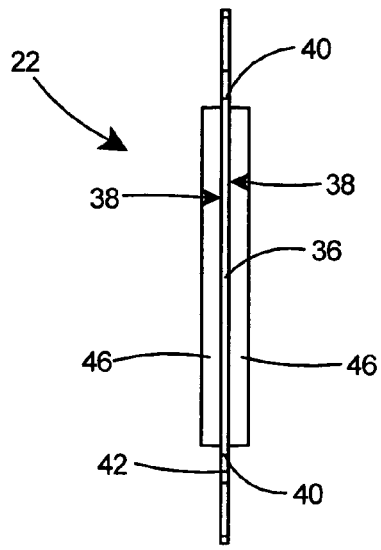
FIG. 4 is a side view of the rigid cable frame.
Figure 5:
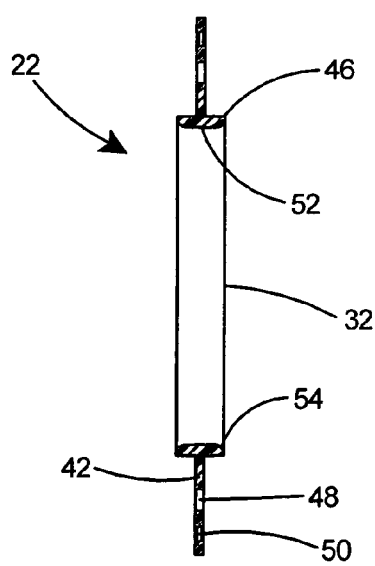
FIG. 5 is a sectional view of the rigid cable frame taken along line 5-5 of FIG. 3.

Referring to FIG. 1 there is shown a preferred embodiment of the present invention, an electrical cable entry device 20 with a rigid frame and a flexible slotted insert. The electrical cable entry device 20 includes a rigid cable frame 22 and a flexible insert 24. The cable entry device 20 is shown in alignment with a conventional electrical box 26 and a decorative-style cover plate 28 to illustrate the operation of the cable entry device 20. The cable entry device 20 provides a simple cable entry port on a wall or similar surface that enables the user to pass low voltage electrical cables there through (not shown) in order to extend the low voltage signals, such as telephone cables, coax cables for television and interne service, wiring for home entertainment systems and surround sound, and cables for connecting computers to peripherals such as printers and facsimile machines, to an adjacent room. For better illustration of the separate portions, the rigid cable frame portion 22 and flexible insert portion 24 are shown separated in FIG. 2. The cable frame 22 includes an opening 30 therein that will accommodate the flexible insert 24.

Figure 6:
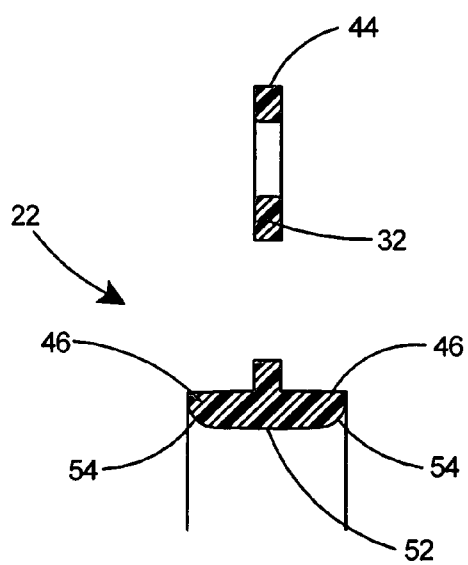
FIG. 6 is a sectional view of the rigid cable frame taken along line 6-6 of FIG. 3.
Figure 11:
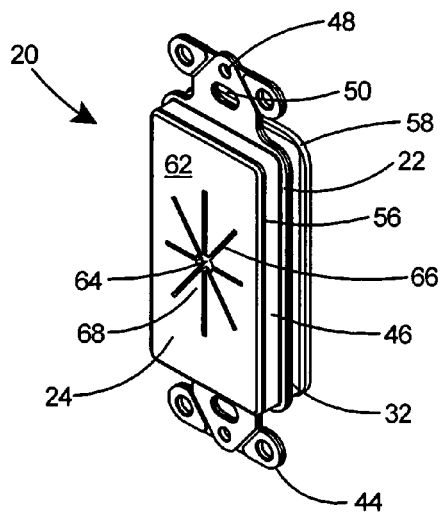
FIG. 11 is a front perspective view of the cable entry device of the present invention.
Figure 12:
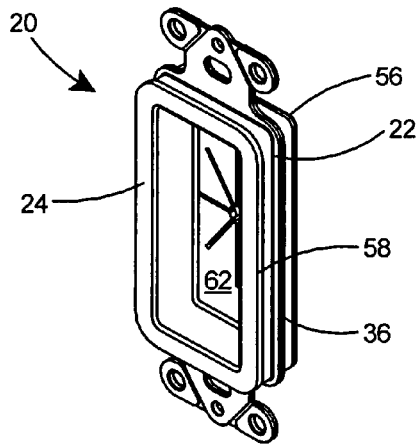
FIG. 12 is a rear perspective view of the cable entry device.
Figure 13:
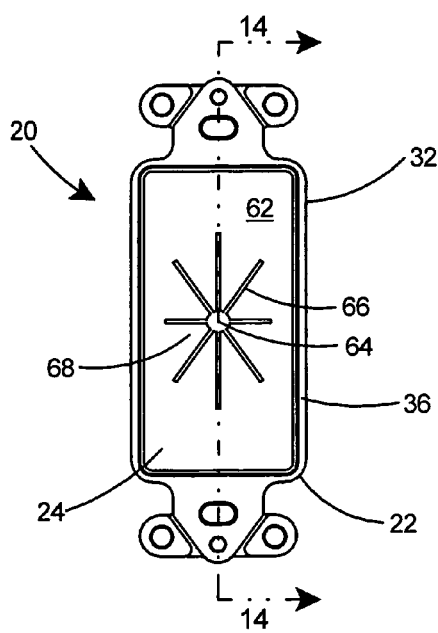
FIG. 13 is a front elevation view of the cable entry device.

With reference to FIGS. 3-6, the rigid cable frame 22 includes a frame body 32 that, as viewed from the front, is substantially rectangular with rounded corners 34. The frame body 32 includes an integral base plate 36, two ends 40, and an outer periphery 41. The base plate 36 includes two sides 38. Two arms 42 are integral with and extend from the ends 40 of the frame body 32 with the arms 42 residing in the same plane as the base plate 36. Two ears 44 extend laterally from each arm 42. A peripheral wall 46 extends outward from either side 38 of the base plate 36. The arms 42 include an oval aperture 48 and a bore 50 therein, with the oval aperture 48 interior of the bore 50 on each arm 42. The frame body 32 includes an inner periphery 52 surrounding opening 30. As shown in FIG. 6, the inner periphery 52 of the frame body 32 includes tapered edges 54 at the edge of the peripheral walls 46.

Referring to FIGS. 7-10, the flexible insert 24 includes a first rim 56, a second rim 58, and a seat 60 between the two rims. A flat membrane 62 is integral with and extends across the first rim 56. The membrane 62 includes a hole 64 in the center and eight open slots 66 extending radially outward from the hole 64 thereby forming eight flaps 68 in the membrane 62. As shown in FIGS. 9 and 10, second rim 58 extends a greater distance from the seat 60 than the first rim 56 does.

As shown in FIG. 8, it is important to enable the flaps 68 to open freely upon insertion of cables through the membrane 62 and therefore the slots 66 preferably include a width W1 of at least 0.062 inch. It is important that the slots 66 are open areas and not just slits in the membrane 62. As shown in FIG. 10, the thickness T1 of the membrane 62 is preferably at least 0.062 inch.

Figure 14:
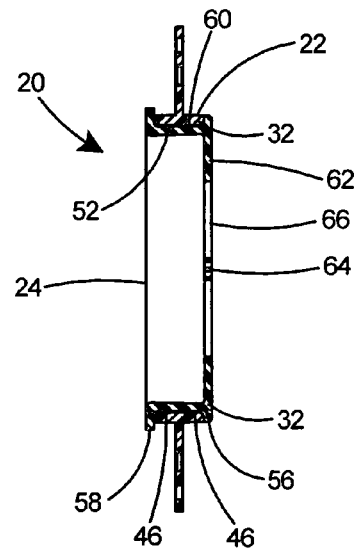
FIG. 14 is a sectional view of the cable entry device taken along line 14-14 of FIG. 13.

With reference to FIGS. 11-14 there is shown the electrical cable entry device 20 with flexible slotted insert 24. To form the cable entry device 20, flexible insert 24 is simply pressed within the opening 30 (see FIG. 2) of the rigid cable frame 22. The outer periphery of the seat 60 is substantially the same size as the inner periphery 52 of frame body 32. As flexible insert 24 is pressed within opening 30, the flexible insert 24 is capable of deforming slightly until it is seated within the frame body 32. After the flexible insert 24 is seated within the frame body 32, it is held therein by first rim 56 and second rim 58 which engage opposing sides of the peripheral walls 46. As shown in FIG. 14, after flexible insert 24 is fully inserted within the frame body 32, the seat 60 of flexible insert 24 bears against the inner periphery 52 of the frame body 32.

The electrical cable entry device 20 with flexible slotted insert 24 can be used in conjunction with substantially any conventional electrical housing, which term "electrical housing" includes conventional electrical boxes or conventional low voltage frames, to provide a portal for passing low voltage electrical cables between rooms. With reference to FIG. 1, the cable entry device 20 is simply secured to the standard connection points 70 in an electrical box by driving fasteners 72 through oval apertures 48 into connection points 70. A conventional decorative-style cover plate 28 is then fastened to the cable entry device 20 by driving fasteners 74 into bores 50 in the arms 42 of cable entry device 20. With decorative cover plate 28 secured to cable entry device 20, the open slots 66 and flaps 68 facilitate passing of low voltage electrical cables (not shown) through the membrane 62 of the cable entry device 20. The flaps 68 move aside to enable passage of cables there through and, as a result of the flexibility and resilience of the insert 24 material, reclose to the extent possible thereby closing substantially the area around the inserted cables and blocking the view into the electrical box.

Figure 16:
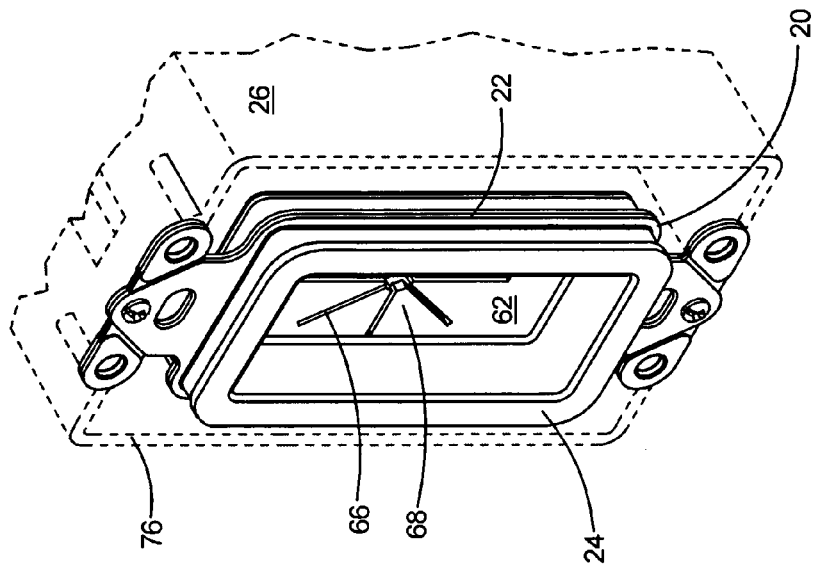
FIG. 16 is a perspective view of the multiple flap cable entry device mounted to an electrical box in a second orientation, with the membrane facing inward from the open face of the electrical box.
Figure 15:
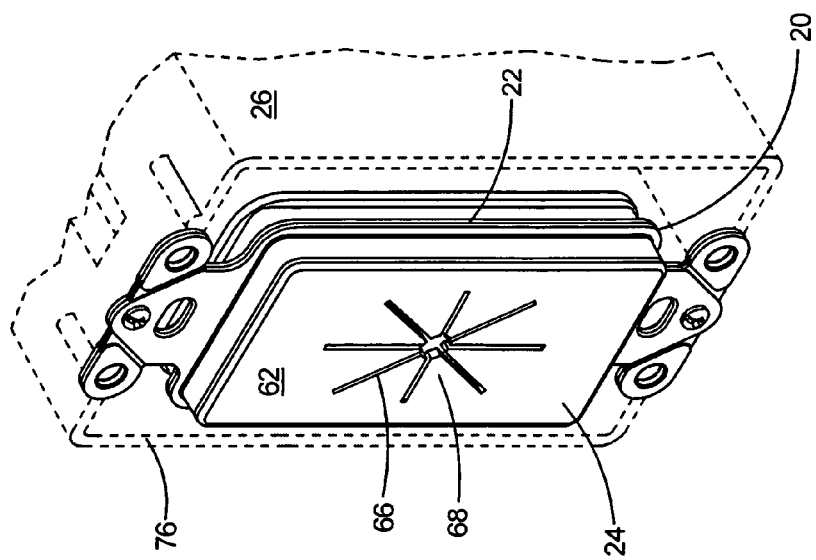
FIG. 15 is a perspective view of the multiple flap cable entry device mounted to an electrical box in a first orientation, with the membrane facing outward from the open face of the electrical box.

With reference to FIGS. 15 and 16, the electrical cable entry device 20 with flexible slotted insert 24 can be attached to a conventional electrical box or a conventional low voltage frame, of which an electrical box 26 is shown in the figures, in either of two orientations, based on the desires of the homeowner. FIG. 15 depicts a first orientation in which the membrane 62 of the cable entry device 20 is facing outward from the open face 76 of the electrical box 26. FIG. 16 depicts a second orientation in which the membrane 62 is facing inward from the open face 76 of the electrical box 26. Thus the homeowner has the choice of mounting the cable entry device 20 in either orientation. In each orientation, the flaps 68 of the flexible membrane 62 will move aside as low voltage cables (not shown) are passed through the flexible insert 24 and, after the cables are inserted, the flaps 68 that are unimpeded by cables will return to their unbiased position to close off much of the open space around the inserted cables. The two orientations provide the homeowner with a choice of mounting the cable entry device 20 with the membrane 62 extending through the opening in the decorative cover (not shown) or with the membrane 62 recessed within the electrical box 26. In either orientation, the cable entry device 20 of the present invention has demonstrated unexpected results in that it provides an easy and quickly installable option for providing a cable entry portal in which all portions contacting the inserted low voltage cables are flexible and thereby protect the low voltage cables against abrasion.

The rigid cable frame portion 22 of the cable entry device 20 of the present invention, of which a preferred embodiment has been shown and described herein, is preferably molded in one piece of plastic. This enables production of the rigid cable frame 22 of the present invention in high speed molding equipment at low unit cost. This provides a cable entry device 20 that may easily be attached to most conventional electrical boxes or low voltage frames, including those low voltage frames that are clamped onto a wall by the use of a front flange and rotatable flags. The cable entry device may be molded of various plastics including polycarbonate, polyvinyl chloride, acrylonitrile-butadiene styrene, and polyethylene.

The flexible insert 24 is preferably molded of an elastomeric material such as synthetic rubber. Most preferably, the flexible insert is formed of SANTOPRENE®, a synthetic rubber elastomeric material available from Monsanto Company Corporation of St. Louis, Mo.

Although the description above contains many specific descriptions, materials, and dimensions, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A cable entry device for routing cables through a wall comprising:
    a rigid cable frame including a frame body having two ends and an opening therein;
    an arm extending from each of said ends of said frame body;
    a flexible insert within said opening of said frame body;
    said flexible insert including a membrane extending across said opening of said frame body;
    said membrane of said flexible insert including a hole therein and a plurality of open slots extending radially from said hole of said membrane;
    an outer periphery on said frame body; and
    a base plate extending from said outer periphery of said frame body.

2. The cable entry device of claim 1 including
    two sides on said base plate, and
    a peripheral wall extending outward from each side of said base plate of said frame body.

3. The cable entry device of claim 2 including an inner periphery surrounding said opening of said frame body.

4. The cable entry device of claim 3 wherein said inner periphery of said frame body includes tapered edges on said peripheral walls.

5. The cable entry device of claim 1 wherein said arms reside in the same plane as said base plate.

6. The cable entry device of claim 1 wherein said open slots define a plurality of flaps on said membrane.

7. The cable entry device of claim 6 wherein said membrane of said flexible insert includes eight of said slots and eight of said flaps.

8. The cable entry device of claim 1 wherein said flexible insert is constructed of an elastomeric material.

9. The cable entry device of claim 8 wherein said elastomeric material is synthetic rubber.

10. The cable entry device of claim 1 wherein each of said open slots have a width of at least 0.062 inch.

11. The cable entry device of claim 1 wherein said frame body is molded in one piece of plastic.

12. The cable entry device of claim 11 wherein said plastic is selected from the group including polycarbonate, polyvinyl chloride, acrylonitrile-butadiene styrene, and polyethylene.

13. A cable entry device for routing cables through a wall comprising:
    a rigid cable frame including a frame body having two ends and an opening therein;
    an arm extending from each of said ends of said frame body;
    a flexible insert within said opening of said frame body;
    said flexible insert including a membrane extending across said opening of said frame body;
    said membrane of said flexible insert including a hole therein and a plurality of open slots extending radially from said hole of said membrane; and
    two ears extending laterally from each of said arms of said frame body.

14. A cable entry device for routing cables through a wall comprising:
    a rigid cable frame including a frame body having two ends and an opening therein;
    an arm extending from each of said ends of said frame body;
    a flexible insert within said opening of said frame body;
    said flexible insert including a membrane extending across said opening of said frame body;
    said membrane of said flexible insert including a hole therein and a plurality of open slots extending radially from said hole of said membrane; and
    said arms include an oval aperture and a bore therein.

15. The cable entry device of claim 14 wherein
    said oval aperture is interior of said bore on each of said arms;
    said oval aperture is adapted to accept a fastener for securing said cable entry device to an electrical housing; and
    said bore is adapted to accept a fastener for securing a decorative electrical cover plate to said frame body.

16. A cable entry device for routing cables through a wall comprising:
    a rigid cable frame including a frame body having two ends and an opening therein;
    an arm extending from each of said ends of said frame body;
    a flexible insert within said opening of said frame body;
    said flexible insert including a membrane extending across said opening of said frame body;
    said membrane of said flexible insert including a hole therein and a plurality of open slots extending radially from said hole of said membrane; and
    said flexible insert includes a first rim, a second rim, and a seat extending between said first rim and said second rim.

17. The cable entry device of claim 16 wherein said membrane extends from said first rim of said flexible insert.

18. The cable entry device of claim 16 wherein said second rim extends a greater distance from said seat than said first rim extends from said seat.

19. A cable entry device for routing cables through a wall comprising:
    a rigid cable frame including a frame body having two ends and an opening therein;
    an arm extending from each of said ends of said frame body;
    a flexible insert within said opening of said frame body;
    said flexible insert including a membrane extending across said opening of said frame body;

said membrane of said flexible insert including a hole therein and a plurality of open slots extending radially from said hole of said membrane; and said cable entry device can be mounted to an electrical housing having an open face in either of two orientations, said orientations including a first orientation in which said membrane is positioned away from the open face of the electrical housing and a second orientation in which said membrane is positioned toward the open face of the electrical housing.

* * * * *